(12) United States Patent
Ferguson et al.

(10) Patent No.: US 8,977,007 B1
(45) Date of Patent: Mar. 10, 2015

(54) DETECTING A VEHICLE SIGNAL THROUGH IMAGE DIFFERENCING AND FILTERING

(71) Applicant: Google Inc., Mountain View, CA (US)

(72) Inventors: David Ian Franklin Ferguson, San Francisco, CA (US); Abhijit Ogale, Mountain View, CA (US); Matthew Wang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 133 days.

(21) Appl. No.: 13/868,353

(22) Filed: Apr. 23, 2013

(51) Int. Cl.
*G06K 9/00* (2006.01)
*G08G 1/123* (2006.01)
*H04N 5/225* (2006.01)

(52) U.S. Cl.
CPC .................. *G06K 9/00791* (2013.01)
USPC ............................ 382/104; 340/988; 348/169

(58) Field of Classification Search
CPC ....................................................... G06K 9/00
USPC .......... 382/103, 104, 107, 236; 348/148, 169; 340/988, 991, 995.17, 995.25; 701/49, 701/207
See application file for complete search history.

(56) References Cited

U.S. PATENT DOCUMENTS

| | | | | |
|---|---|---|---|---|
| 7,899,213 | B2 * | 3/2011 | Otsuka et al. | 382/104 |
| 2012/0050074 | A1 * | 3/2012 | Bechtel et al. | 340/988 |

FOREIGN PATENT DOCUMENTS

JP  2009157492  7/2009

* cited by examiner

*Primary Examiner* — Abolfazl Tabatabai
(74) *Attorney, Agent, or Firm* — McDonnell Boehnen Hulbert & Berghoff LLP

(57) ABSTRACT

Methods and systems for detecting a vehicle signal through image differencing and filtering are described. A computing device may be configured to receive a sequence of images of an identified vehicle in a vicinity of a given vehicle. The computing device may be configured to determine, based on a comparison of a first image of a pair of images of the sequence of images to a second image of the pair of images, a portion of image data exhibiting a change in color and a change in brightness between the first image and the second image of the pair of images. The computing device may be configured to determine that the portion indicates a light signal for the identified vehicle; and provide instructions to control the given vehicle based on the light signal of the identified vehicle.

20 Claims, 11 Drawing Sheets

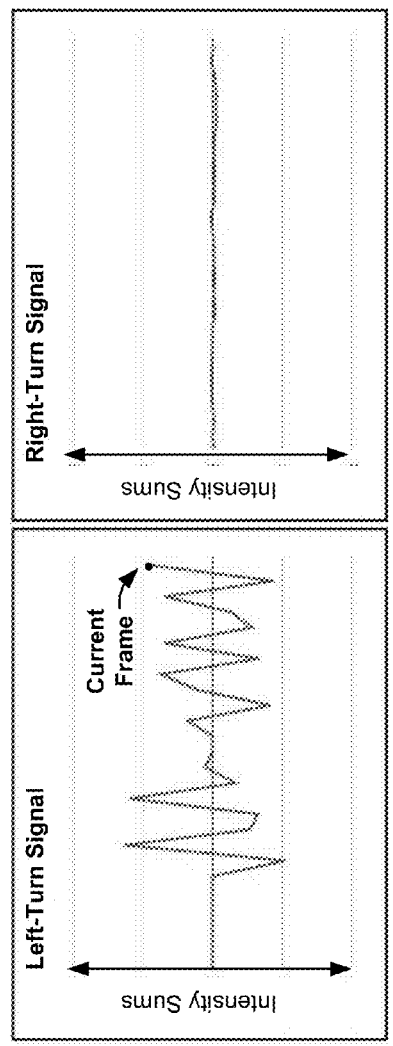
FIGURE 6A
FIGURE 6B
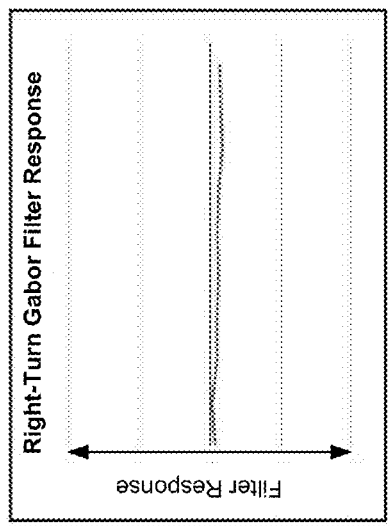
FIGURE 6D
FIGURE 6C

COMPUTER PROGRAM PRODUCT 700

SIGNAL BEARING MEDIUM 701

PROGRAM INSTRUCTIONS 702

- RECEIVING, AT A COMPUTING DEVICE, A SEQUENCE OF IMAGES OF AN IDENTIFIED VEHICLE IN A VICINITY OF A GIVEN VEHICLE, WHERE THE SEQUENCE OF IMAGES IS CAPTURED BY AN IMAGE-CAPTURE DEVICE COUPLED TO THE GIVEN VEHICLE

- DETERMINING, BASED ON A COMPARISON OF A FIRST IMAGE OF A PAIR OF IMAGES OF THE SEQUENCE OF IMAGES TO A SECOND IMAGE OF THE PAIR OF IMAGES, A PORTION OF IMAGE DATA EXHIBITING A CHANGE IN COLOR AND A CHANGE IN BRIGHTNESS BETWEEN THE FIRST IMAGE AND THE SECOND IMAGE OF THE PAIR OF IMAGES

- DETERMINING ONE OR MORE TEMPORAL CHARACTERISTICS INDICATIVE OF A FREQUENCY OF THE CHANGE IN BRIGHTNESS OF THE PORTION IN THE SEQUENCE OF IMAGES

- DETERMINING, BASED ON THE ONE OR MORE TEMPORAL CHARACTERISTICS, THAT THE PORTION INDICATES A LIGHT SIGNAL FOR THE IDENTIFIED VEHICLE

- PROVIDING, BY THE COMPUTING DEVICE, INSTRUCTIONS TO CONTROL THE GIVEN VEHICLE BASED ON THE LIGHT SIGNAL OF THE IDENTIFIED VEHICLE

| COMPUTER READABLE MEDIUM 703 | COMPUTER RECORDABLE MEDIUM 704 | COMMUNICATIONS MEDIUM 705 |
|---|---|---|

FIGURE 7

DETECTING A VEHICLE SIGNAL THROUGH IMAGE DIFFERENCING AND FILTERING

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present disclosure describes embodiments that relate to detecting a vehicle signal through image differencing and filtering. In one aspect, the present disclosure describes a method. The method may comprise receiving, at a computing device, a sequence of images of an identified vehicle in a vicinity of a given vehicle. The sequence of images may be captured by an image-capture device coupled to the given vehicle. The method also may comprise determining, based on a comparison of a first image of a pair of images of the sequence of images to a second image of the pair of images, a portion of image data exhibiting a change in color and a change in brightness between the first image and the second image of the pair of images. The method further may comprise determining one or more temporal characteristics indicative of a frequency of the change in brightness of the portion in the sequence of images. The method also may comprise determining, based on the one or more temporal characteristics, that the portion indicates a light signal for the identified vehicle. The method further may comprise providing, by the computing device, instructions to control the given vehicle based on the light signal of the identified vehicle.

In another aspect, the present disclosure describes a non-transitory computer readable medium having stored thereon executable instructions that, upon execution by a computing device, cause the computing device to perform functions. The functions may comprise receiving a sequence of images of an identified vehicle in a vicinity of a given vehicle, where the sequence of images may be captured by an image-capture device coupled to the given vehicle. The functions also may comprise determining, based on a comparison of a first image of a pair of images of the sequence of images to a second image of the pair of images, a portion of image data exhibiting a change in color and a change in brightness between the first image and the second image of the pair of images. The functions further may comprise determining one or more temporal characteristics indicative of a frequency of the change in brightness of the portion in the sequence of images. The functions also may comprise determining, based on the one or more temporal characteristics, that the portion indicates a light signal for the identified vehicle. The functions further may comprise providing instructions to control the given vehicle based on the light signal of the identified vehicle.

In still another aspect, the present disclosure describes a control system. The control system may comprise at least one processor. The control system also may comprise a memory having stored thereon executable instructions that, upon execution by the at least one processor, cause the control system to perform functions comprising receiving a sequence of images of an identified vehicle in a vicinity of a given vehicle, and the sequence of images may be captured by an image-capture device coupled to the given vehicle. The functions may also comprise determining, based on a comparison of a first image of a pair of images of the sequence of images to a second image of the pair of images, a portion of image data exhibiting a change in color and a change in brightness between the first image and the second image of the pair of images. The functions further may comprise determining one or more temporal characteristics indicative of a frequency of the change in brightness of the portion in the sequence of images. The functions may also comprise determining, based on the one or more temporal characteristics, that the portion indicates a light signal for the identified vehicle. The functions further may comprise providing instructions to control the given vehicle based on the light signal of the identified vehicle.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 6A illustrates a temporal signal representing change in intensity for the left-turn signal light, in accordance with an example embodiment.

FIG. 6B illustrates a temporal signal representing change in intensity for the right-turn signal light, in accordance with an example embodiment.

FIG. 6C illustrates a filtered temporal signal associated with the left-turn signal light, in accordance with an example embodiment.

FIG. 6D illustrates a filtered temporal signal associated with the right-turn signal light, in accordance with an example embodiment.

FIG. 7 is a schematic illustrating a conceptual partial view of a computer program, in accordance with an example embodiment.

DETAILED DESCRIPTION

Figure 1:
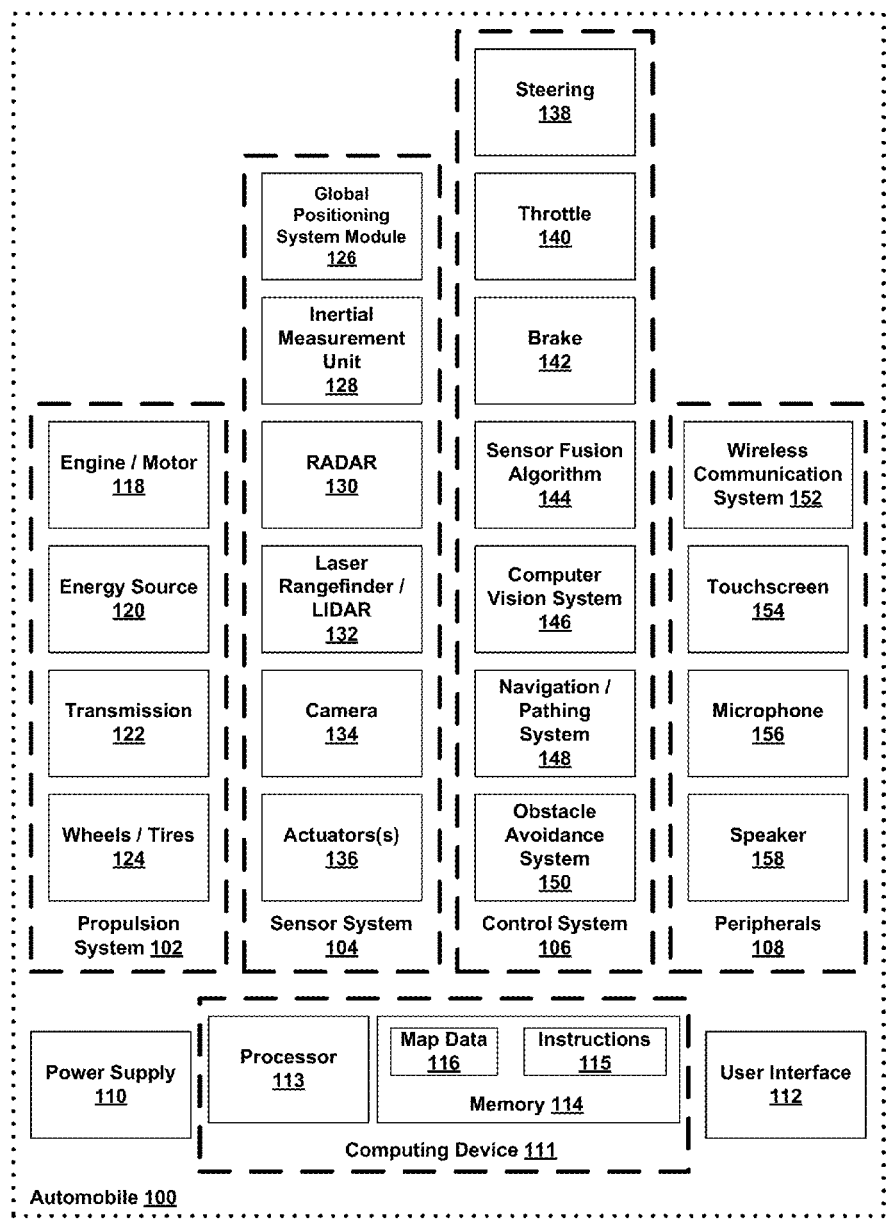
FIG. 1 is a simplified block diagram of an example automobile, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road may rely on detection of obstacles or objects on the road for navigation. Disclosed herein are a method and system for detecting turn signal usage on vehicles in front of the autonomous vehicle by using camera imagery. The system is configured to detect when a turn signal is activated, and which direction the signal indicates. This information may be useful for lane change prediction and improving prediction of whether a vehicle will enter the same lane of the autonomous vehicle. In this manner, the autonomous vehicle, based on the improved prediction, may be configured to respond appropriately and safely.

In some examples, a computing device, configured to control a vehicle, may be configured to identify vehicles in a vicinity of the vehicle. For example, the computing device may be configured to identify the vehicles that are within a threshold distance from the first vehicle, and discard vehicles (for the purposes of certain decision-making processes) that are at least partially occluded by other objects on the road.

The computing device may be configured to receive a sequence of images of an identified vehicle, where the sequence of images is captured by an image-capture device coupled to the vehicle. The computing device may be configured to determine, for a pair of images of the sequence of images, a difference image by subtracting content of a first image of the pair of images from content of a second image of the pair of images, or the content of the second image from the content of the first image. However, because the images are captured sequentially in time and the identified vehicle is moving, the first image and the second image may be misaligned, i.e., the identified vehicle may not be depicted in the same relative location in the first image as in the second image. Thus, the computing device may not be able to accurately remove common content between the first image and the second image, and the difference image may include blurry portions as a result. To alleviate this issue, the computing device may be configured to align the first image and second image. For instance, the computing device may be configured to determine a feature in the first image of the pair of images, and a corresponding feature in the second image; determine, based on a comparison of the feature to the corresponding feature, a transform; and apply the transform to align the first image with the second image.

The computing device may be configured to identify in the difference image a portion having a predetermined color (e.g., orange color of a typical turn signal) in either the first image or the second image and exhibiting a change in color and a change in intensity (e.g., brightness) between the first image and the second image of the pair of images. The computing device further may be configured to determine one or more temporal characteristics indicative of a frequency of the change in intensity of the portion in the sequence of images. Further, the computing device may be configured to detect, based on the one or more temporal characteristics, that the portion indicates an active turn signal for the identified vehicle. Based on the detection, the computing device may be configured to modify a control strategy associated with a driving behavior of the vehicle, and provide instructions to control the vehicle based on the modified control strategy.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of a non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the automobile 100. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
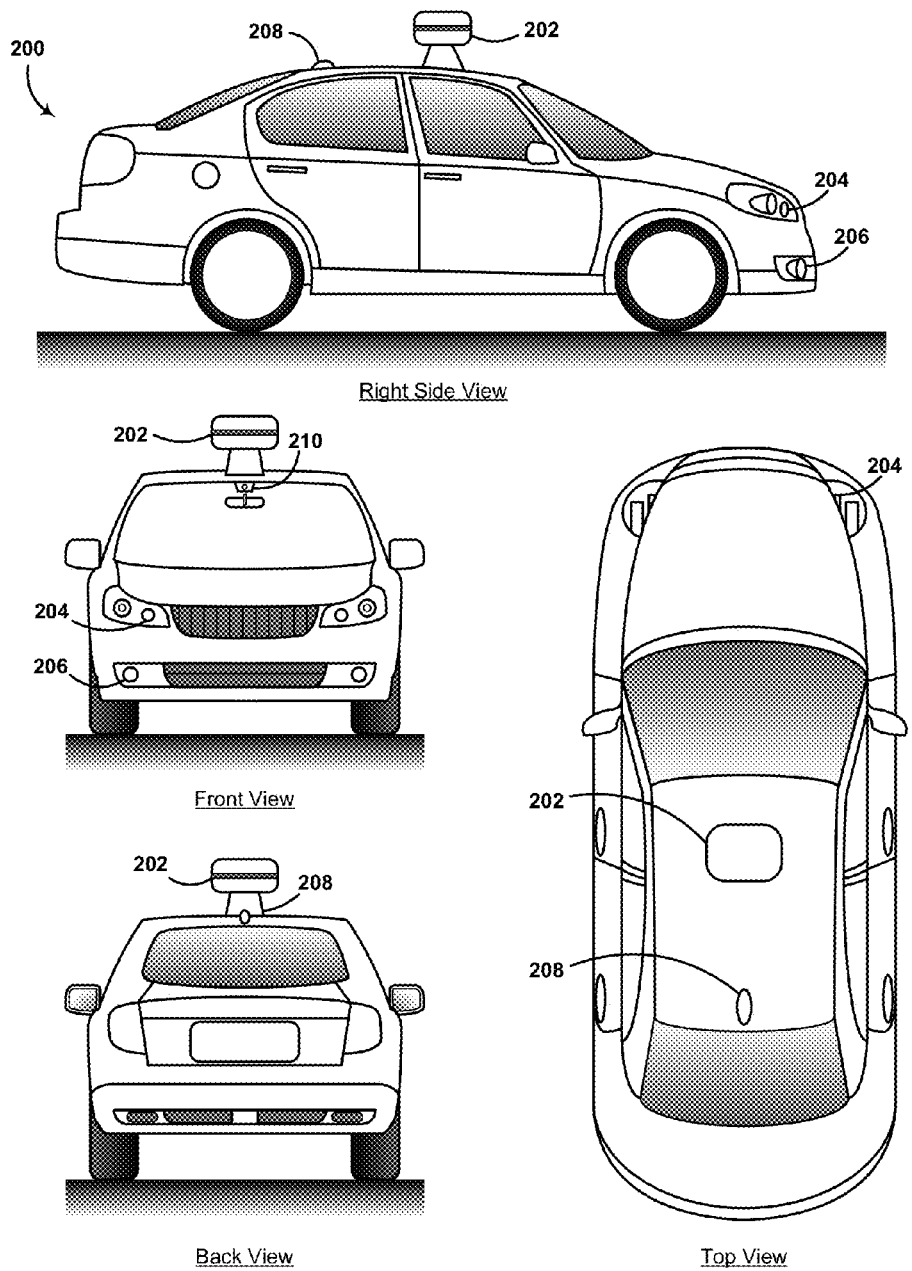
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions, and also may be configured to modify the control strategy and driving behavior based on changes in the driving conditions.

Figure 3:
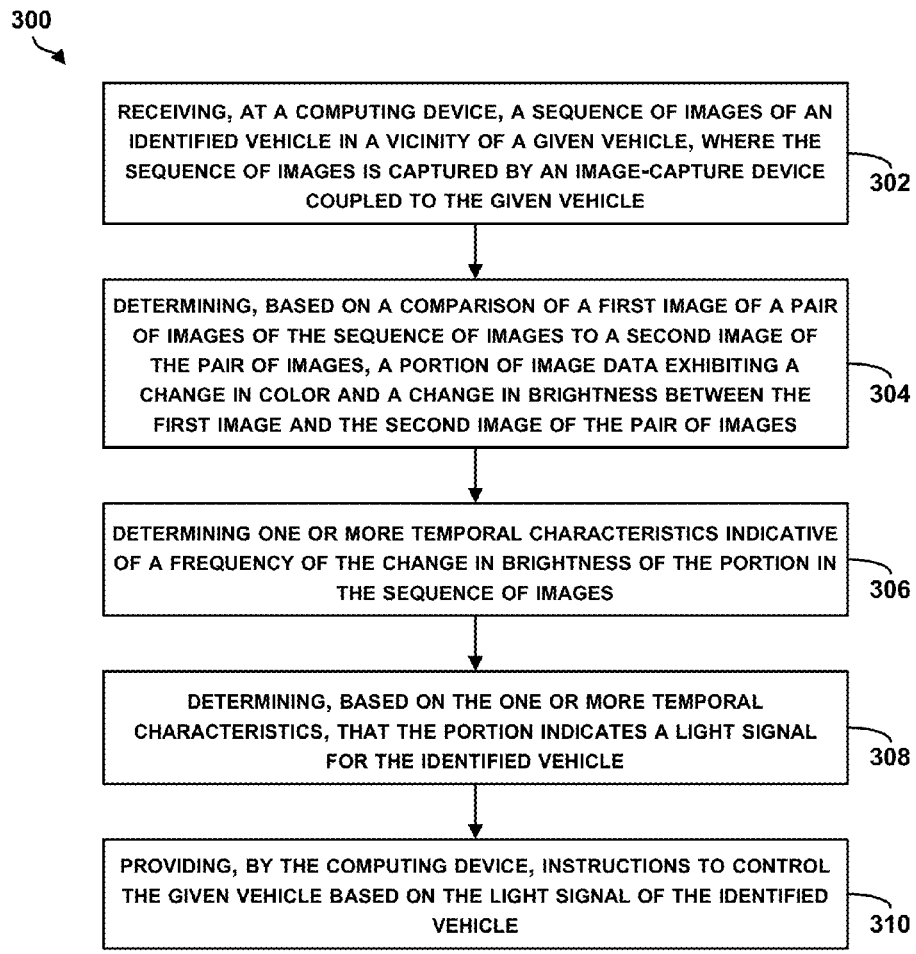
FIG. 3 is a flow chart of a method for detecting a vehicle signal through image differencing and filtering, in accordance with an example embodiment.

FIG. 3 is a flow chart of a method 300 for detecting vehicle signals through image differencing and filtering, in accordance with an example embodiment. The method 300 may include one or more operations, functions, or actions as illustrated by one or more of blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. Although the method 300 is described in the context of detecting an active turn signal, the method 300 can be used to detect any other type of light signals such as a brake light, headlamp light, an auxiliary lamp light, or a strobe light of a police car. These are just examples, and other light signals can be detected by the method 300.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer-readable medium, for example, such as computer-readable media that stores data for short periods of time like register memory, processor cache and Random Access Memory (RAM). The computer-readable medium may also include non-transitory media or memory, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, a tangible storage device, or other article of manufacture, for example. In addition, for the method 300 and other processes and methods disclosed herein, each block in FIG. 3 may represent circuitry that is wired to perform the specific logical functions in the process.

At block 302, the method 300 includes receiving, at a computing device, a sequence of images of an identified vehicle in a vicinity of a given vehicle, wherein the sequence of images is captured by an image-capture device coupled to the given vehicle. A controller or a computing device, such as the computing device 111 in FIG. 1, may be onboard a vehicle or may be off-board but in wireless communication with the vehicle, for example. Also, the computing device may be configured to control the vehicle in an autonomous or semi-autonomous operation mode. Further, the computing device may be configured to receive, from sensors and devices coupled to the vehicle, information associated with, for example, condition of systems and subsystems of the vehicle, driving conditions, road conditions, etc.

A camera, such as the camera 134 in FIG. 1 or the camera 210 in FIG. 2 or any other image-capture device, may be coupled to the vehicle and may be in communication with the computing device. The camera may be configured to capture images or a video of the road and vicinity of the road. The computing device may be configured to receive the images or video and identify, using image processing techniques for example, objects depicted in the image or the video. The computing device may be configured to compare portions of the images to templates of objects to identify the objects, for example. Examples of objects may include vehicles, moving or static objects, traffic signs, obstacles on the road, pedestrians, lane markers, etc.

Figure 4A:
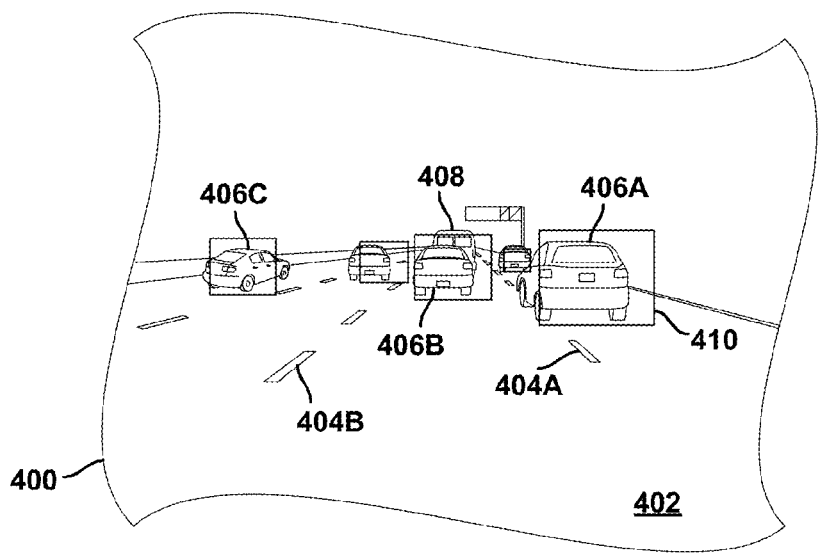
FIG. 4A illustrates an image of a road of travel of a vehicle and identification of vehicles, in accordance with an example embodiment.

FIG. 4A illustrates an image 400 of a road 402 of travel of a vehicle and identification of vehicles, in accordance with an example embodiment. The vehicle may be controlled by the computing device described above. The image 400 may be captured from a camera coupled to the vehicle while travelling on the road 402, for example. The image 400 depicts the road 402, white lines such as lines 404A and 404B representing lane boundaries, and vehicles in the vicinity of the vehicle such as vehicles 406A, 406B, and 406C.

In some examples, identifying vehicles in the vicinity of the vehicle controlled by the computing device may include processing images to identify vehicles within a threshold distance from the vehicle, and discarding (e.g., removing from the images) vehicles that are not within the threshold distance. Distance between the vehicle and the other vehicle may be estimated using LIDAR-based information, for example. Further, the computing device may be configured to discard vehicles (for the purposes of certain decision-making processes) that are occluded, or partially occluded by other objects on the road. For instance, in FIG. 4A, vehicle (van) 408 is partially occluded by the vehicle 406B. Thus, the vehicle 408 may be discarded by the computing device for the purposes of detecting active vehicle signals.

In FIG. 4A, control strategy and driving behavior of the vehicle controlled by the computing device may be influenced by the vehicle 406A due to closeness of the vehicle 406A to the vehicle (e.g., the vehicle 406A being within a threshold distance from the vehicle). Thus, the computing device may be configured to monitor the vehicle 406A. For example, the computing device may be configured to receive a sequence of images (or frames) of the vehicle 406A to detect if the vehicle 406A may, for instance, be changing lanes, have activated a turn signal or a brake light, have stopped, etc.

In examples, the computing device may be configured to determine areas or portions of an image depicting the identified vehicles. For example, the computing device may be configured to determine a bounding box 410 associated with the vehicle 406A. The bounding box 410 may define a coverage area of the image 400, where image pixels inside that bounding box 410 may represent the vehicle 406A, for example. The computing device may be configured to determine the bounding box 410 such that the bounding box 410 is rectangular in shape and may be larger in size than the identified vehicle 406A. As an example, the bounding box 410 may have a horizontal buffer that extends beyond horizontal boundaries (i.e., width) of the vehicle 406A. In this manner, the computing device may be configured to account for the vehicle 406A shifting horizontally (e.g., beginning to changing lanes), and thus, changing position in sequential images or frames.

Figure 4B:
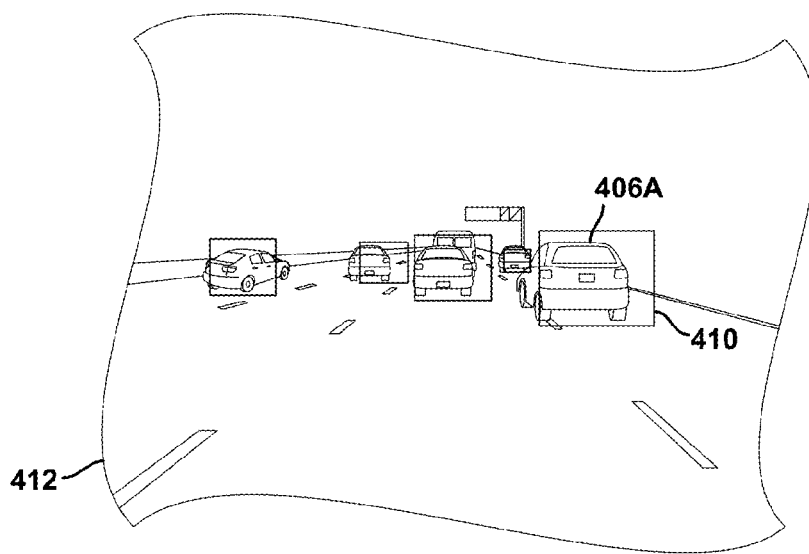
FIG. 4B illustrates another image captured after the image illustrated in FIG. 4A was captured, in accordance with an example embodiment.

FIG. 4B illustrates another image 412 captured after the image illustrated in FIG. 4A was captured, in accordance with an example embodiment, in accordance with an example embodiment. Thus, the images 400 and 412 may represent a pair of sequential images of a sequence of images captured to monitor the vehicle 406A, for example. It should be noted that as the vehicle controlled by the computing device approaches, or is approached by, the vehicle 406A, a size of the bounding box 410 may increase because the area of an image depicting the vehicle 406A increased in size. For instance, the bounding box 410 may be larger in the image 412 or consecutive images as compared to a respective size of the bounding box 410 in the image 400.

Figure 4C:
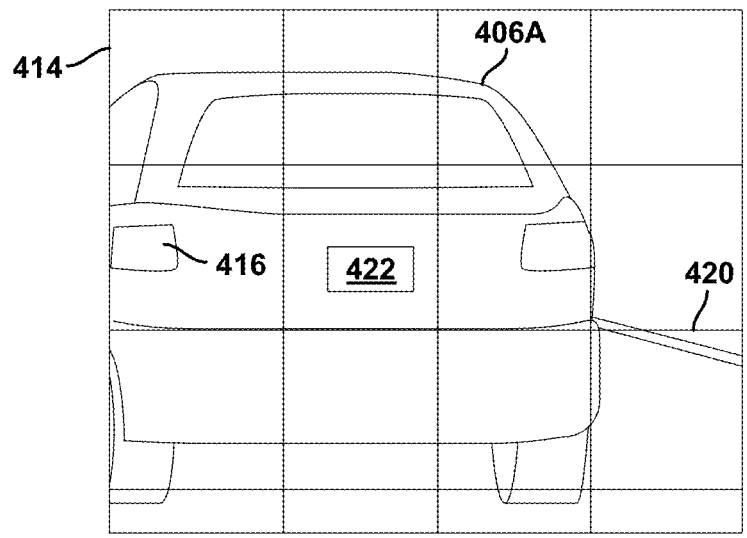
FIG. 4C illustrates a zoomed-in image of the identified vehicle with the left-turn signal being in an 'off' state, in accordance with an example embodiment.
Figure 4D:
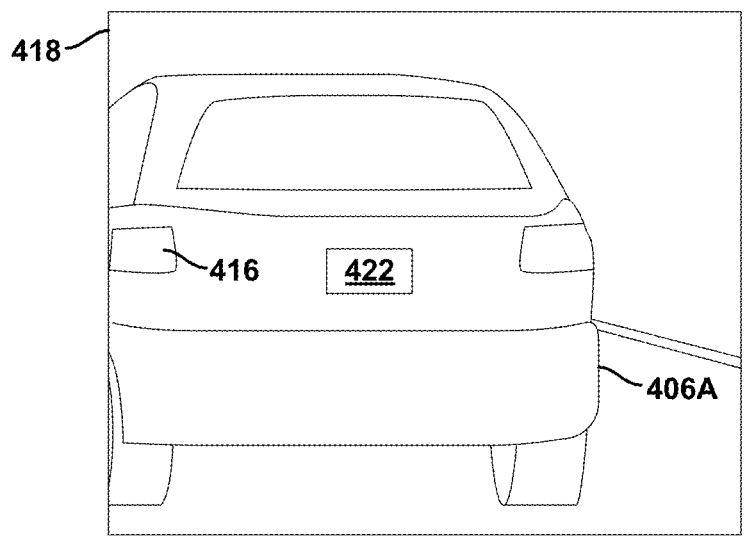
FIG. 4D illustrates a zoomed-in image of the identified vehicle having moved to the left compared to the image in FIG. 4C, and with the left-turn signal being in an 'on' state, in accordance with an example embodiment.

FIG. 4C illustrates a zoomed-in image 414 of the identified vehicle 406A with left-turn signal 416 being in an 'off' state, in accordance with an example embodiment. FIG. 4D illustrates a zoomed-in image 418 of the identified vehicle 406A having moved to the left compared to the image in FIG. 4C, and with the left-turn signal 416 being in an 'on' state, in accordance with an example embodiment. For example, the zoomed-in image 414 may include contents bounded by the bounding box 410 in the image 400, and the zoomed-in image 418 may include contents bounded by the bounding box 410 in the image 412. The zoomed-in image 418 depicts the left-turn signal 416 being in an 'on' state. The method 300 may be implemented by the computing device to detect that the vehicle 406A has an active left-turn signal, for example.

Referring back to FIG. 3, at block 304, the method 300 includes determining, based on a comparison of a first image of a pair of images of the sequence of images to a second image of the pair of images, a portion of image data exhibiting a change in color and a change in brightness between the first image and the second image of the pair of images. With reference to FIGS. 4A-4D, in one example, the computing device may be configured to compare the image 400 to the image 412 to determine one or more differences between the vehicle 406A as depicted in the image 400 and as depicted in the image 412. In another example, the computing device may be configured to compare the zoomed-in image 414 to the zoomed-in image 418 to determine one or more differences between the vehicle 406A as depicted in the image 414 and as depicted in FIG. 418. For instance, the computing device may be configured to overlay the images or views over each other and/or perform a pixel-level comparison to identify the differences. The zoomed-in image 414 and the zoomed-in image 418 will be used as examples for the description herein. However, the images 400 and 412 can be used as well.

In some examples, the computing device may be configured to scale the images 414 and 418 to compensate for motion of the vehicle controlled by the computing device and motion of the vehicle 406A. For example, the vehicle 406A may slow down and shift to the left, while the vehicle controlled by the computing device may maintain a given speed and become closer over time to the vehicle 406A. Thus, a given image captured at a given instant in time may depict the vehicle 406A with a given size, while another image captured at a previous instant of time may depict the vehicle 406A with a smaller size. In this case, the computing device may be configured to scale one or both images to efficiently compare the two images.

In other examples, due to motion (e.g., shifting or translation) of the vehicle 406A from one image to the next image of the pair of images, overlaying the two images or performing pixel to pixel comparison may not yield accurate results. In these examples, the computing device may be configured to align the two images (i.e., the images 414 and 418) before performing the pixel-level comparison. Given the relatively small size of vehicular light signals, the computing device may be configured to perform a pixel-level alignment.

For example, in order to facilitate comparison of the image 414 to the image 418, the computing device may be configured to align the image 414 with the image 418. In one example, to align the image 414 with the image 418, the computing device may be configured to determine a transform. Applying the transform to pixels of the image 414 or pixels of the image 418 may cause the respective view to shift and/or rotate, and thus cause the image 414 to be aligned with the image 418. For instance, the computing device may be configured to determine an object in the image 414 and a corresponding object in the image 418. The computing device may be configured to determine the transform, based on a difference in location of the object in the image 414 with respect to location of the corresponding object in the image 418.

As an example for illustration, a pixel in the image 414 may be denoted by a vector representing two coordinates of a location of the pixel in two-dimensional space (X and Y). The transform, for example, may include a matrix with elements of the matrix being a function of shift (translation in either X or Y or both) and/or rotation of the image 418 relative to the image 414, for example. When the transform (i.e., the matrix) is applied to the pixel, the pixel is spatially aligned to a corresponding pixel in the image 418. Thus, when the transform is applied to pixels of the reference image 414, the image 414 may be aligned with the image 418, i.e., application of the transform may compensate for the shift or motion of the vehicle 406A.

In still another example, the computing device may be configured to determine a grid, such as grid 420 in FIG. 4C in the image 414. The grid 420 defines multiple cells as shown in FIG. 4C. The computing device may be configured to select contents (or features) of a given cell of the cells, and identify corresponding content in the image 418. For example, the computing device may be configured to select box 422 (e.g., license plates), and identify a corresponding portion in the image 418 that includes contents of the box 422 (e.g., using template matching). The computing device may be configured to align the image 414 with the image 418 by overlaying the content of the box 422 in the image 414 with corresponding content in the image 418. FIGS. 4C and 4D are used herein to describe this example, but a similar method can be used for FIGS. 4A and 4B to align the image 400 with the image 412.

Figure 4E:
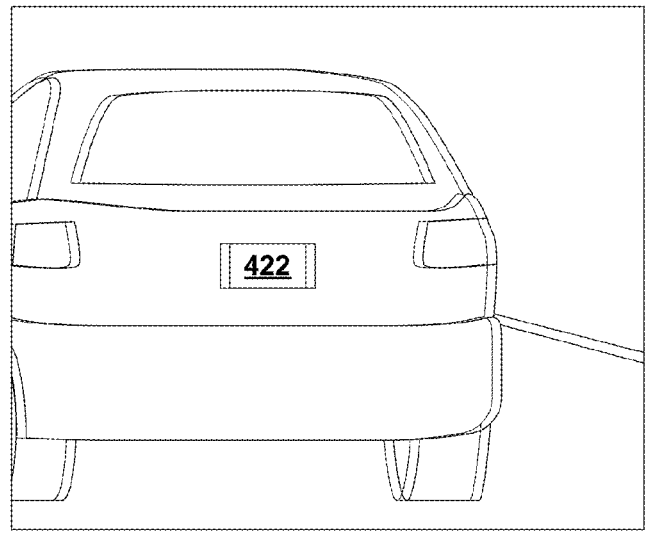
FIG. 4E illustrates the image in FIG. 4D overlaying the image in FIG. 4C before alignment, in accordance with an example embodiment.
Figure 4F:
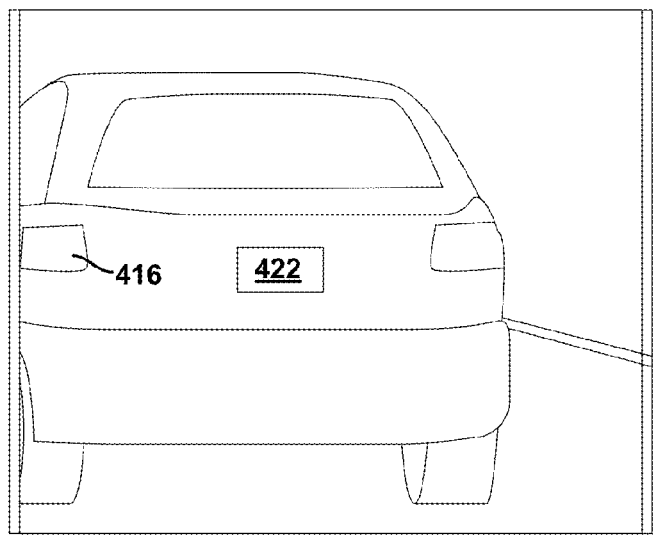
FIG. 4F illustrates the image in FIG. 4D aligned with the image in FIG. 4C, in accordance with an example embodiment.

FIG. 4E illustrates the image 418 in FIG. 4D overlaying the image 414 in FIG. 4C before alignment, in accordance with an example embodiment. The overlaid images in FIG. 4E are blurred because of misalignment. FIG. 4F illustrates the image in FIG. 4D aligned with the image in FIG. 4C, in accordance with an example embodiment. The computing device may be configured to align the image 414 with the image 418 to remove the blurring as described above (e.g., by applying a transform to one of the images). Such alignment facilitates correct identification of differences between the image 414 and the image 418. For example, FIG. 4F shows the 'on' state of the left-turn signal 416, as depicted in the image 418, aligned correctly with the 'off' state depicted in the image 414.

In some examples, to determine a difference between the image 414 and the image 418, the computing device may be configured to subtract content of the image 414 from content of the image 418, or vice versa. Although the images 414 and 418 are used herein as examples, the difference can be identified by subtracting content of the image 400 from content of the image 412, or vice versa.

Each pixel of a given image may be assigned numerical values that represent color and intensity attributes of the pixel. Intensity may refer to a brightness level of a given pixel, for example. Brightness may be an attribute of visual perception in which a source appears to be radiating or reflecting light. In other words, brightness may be a perception produced by luminance of a visual target, such as light of a vehicular signal. Example cylindrical-coordinate representations of pixels in a Red, Green, Blue (RGB) model may include HSL representation (hue, saturation, and lightness), or HSV (hue, saturation, and value) representation. The HSV representation can also be referred to as HSB, where B stands for Brightness. The two representations rearrange geometry of the RGB model in an attempt to be more perceptually relevant than a Cartesian (cube) representation.

With respect to the cylindrical coordinate, in each cylinder, angle around central vertical axis corresponds to "hue", distance from the axis corresponds to "saturation", and distance along the axis corresponds to "lightness", "value" or "brightness". Because HSL and HSV may include transformations of RGB models, physical colors defined by HSL and HSV may depend on the colors of the red, green, and blue primaries of a particular RGB space and on gamma correction used to represent the amounts of the primaries. Numerical HSL or HSV values describe a different color for each basis RGB space. Subtracting content from a first image from content of a second image may include subtracting HSV or HSL values of pixels of the first image from respective HSV or HSL values of respective pixels of the second image, for example. HSL and HSV are used herein as examples only, and any other numerical or qualitative representation can be used to assign intensity and color attributes or characteristics to pixels of a given image.

Figure 5A:
FIG. 5A illustrates a difference image obtained by subtracting content of the image in FIG. 4D from content of the image in FIG. 4C, in accordance with an example embodiment.
Figure 5B:
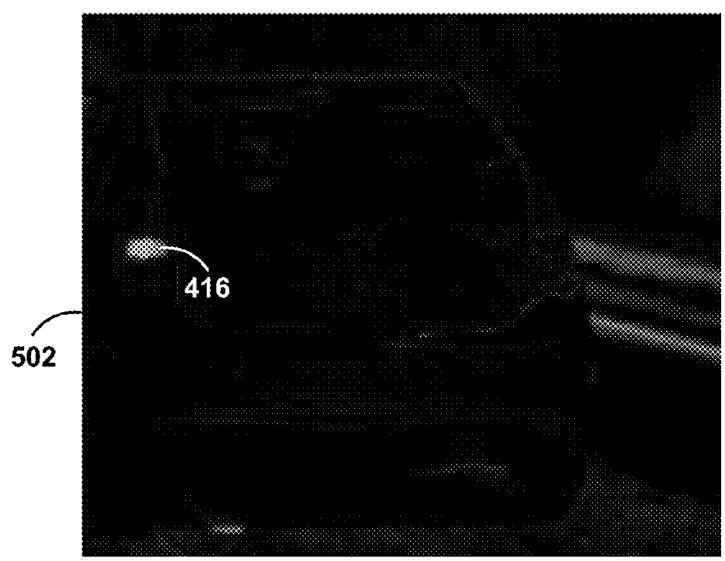
FIG. 5B illustrates another difference image obtained by subtracting content of the image in FIG. 4C from content of the image in FIG. 4D, in accordance with an example embodiment.

FIG. 5A illustrates a difference image 500 obtained by subtracting content of the image 418 in FIG. 4D from content of the image 414 in FIG. 4C, in accordance with an example embodiment. FIG. 5B illustrates another difference image 502 obtained by subtracting content of the image 414 in FIG. 4C from content of the image 418 in FIG. 4D, in accordance with an example embodiment. FIG. 5B shows an intensity change in a portion of the difference image 502 depicting the left-turn signal 416. The left-turn signal 416 does not appear in the difference image 500 because intensity values of the pixels of the image 418 are subtracted from the intensity values of the pixels of the image 414. Due to the subtraction, negative intensity values may result for image portion in the image 418 corresponding to the left-turn signal 416 in the 'on' state. The negative intensity values are not depicted in the difference image 500. In some examples, a single difference image can be created by determining absolute values of the result of subtracting either image from the other.

In addition to determining a change in intensity in the portion of the difference image 502 corresponding to the left-turn signal 416, the computing device may be configured to determine a color associated with the portion, and whether there is a change in color of the portion from the image 414 to the image 418. In some examples, turn signals may have an orange color. To further confirm that the portion of the difference image 502 including the left-turn signal 416 represents a turn signal, an orange color mask can be applied to the difference image 502. For instance, the orange color mask may filter pixels based on HSV values of the pixels. In this manner, pixels having color values (e.g., the HSV-based color numerical values of the pixels) that are within a predetermined color value threshold from a characteristic color of a typical vehicular turn signal, are highlighted or selected. In examples, the mask may be applied to both the difference image 500 and the difference image 502. It is noted that "orange" is used herein as an example only. Turn signals, or other vehicular signals that can be detected by the method 300, may have other colors such as red, yellow, white, or any other color.

Figure 5C:
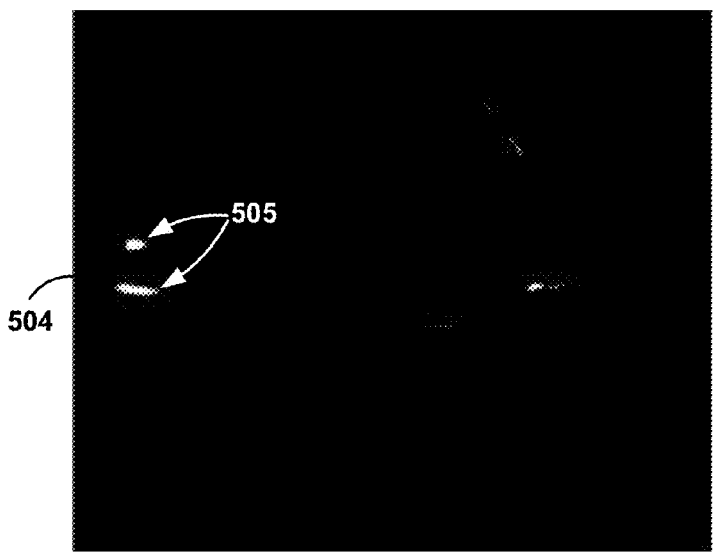
FIG. 5C illustrates applying an orange color mask to the difference image, in accordance with an example embodiment.

FIG. 5C illustrates applying an orange color mask to the difference image 500, in accordance with an example embodiment. Image 504 in FIG. 5C corresponds to the image 500 after applying the orange color mask. The orange color mask may not be binary, and thus, may allow pixels that within a threshold value of the characteristic color to appear in the image 504. The image 504 may depict, for example, the left-turn signal 416 transitioning from an 'on' state to an 'off' state. Therefore, some pixels have color values within the predetermined threshold, and appear as bright spots 505 after applying the mask.

Figure 5D:
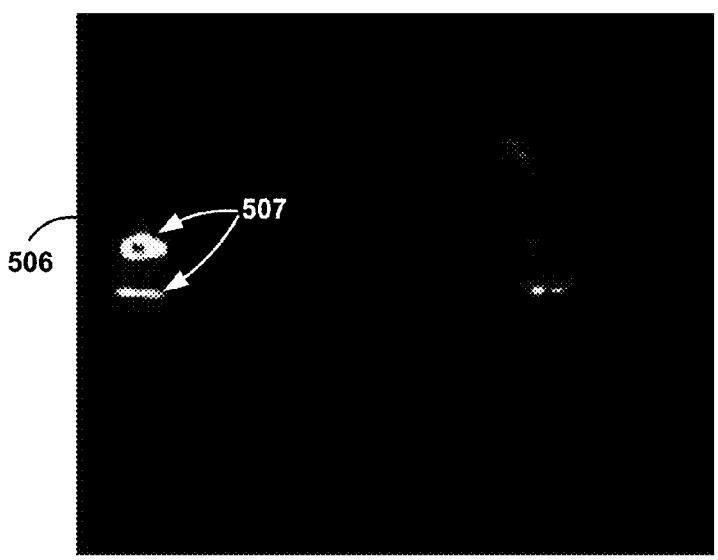
FIG. 5D illustrates applying the orange color mask to the other difference image, in accordance with an example embodiment.

FIG. 5D illustrates applying the orange color mask to the difference image 502, in accordance with an example embodiment. Image 506 in FIG. 5D corresponds to the image 502 after applying the orange color mask. Pixels representing the left-turn signal 416 in an 'on' state are shown as bright spots 507 in the image 506.

Figure 5E:
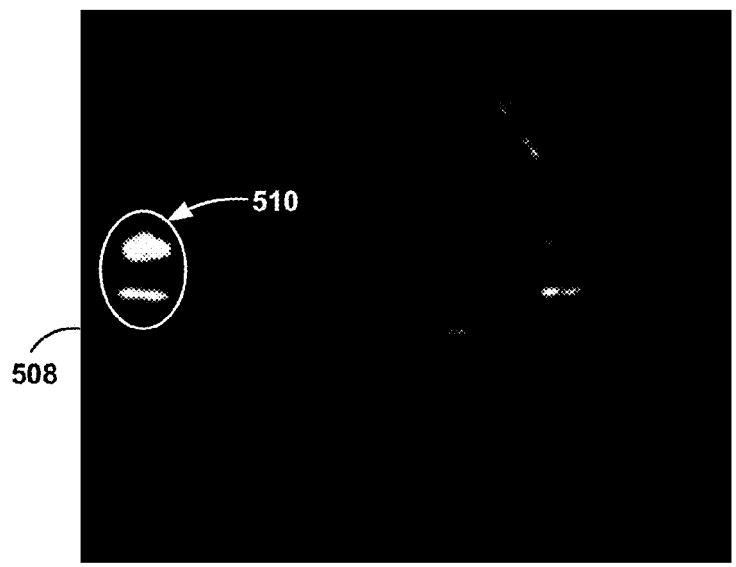
FIG. 5E illustrates a composite image that combines both difference images after applying the orange mask, in accordance with an example embodiment.

FIG. 5E illustrates a composite image that combines both difference images 504 and 506 after applying the orange mask, in accordance with an example embodiment. FIG. 5E depicts region 510 that includes pixels that may be within the predetermined threshold orange color value in either the difference image 504 or 506.

Figure 5F:
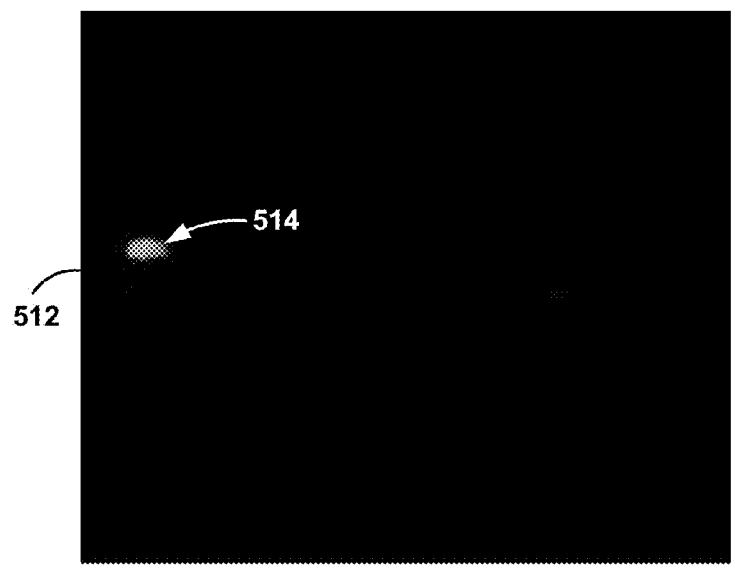
FIG. 5F illustrates a composite image after eliminating portions that do not meet criteria for active light signals, in accordance with an example embodiment.

FIG. 5F illustrates a composite image 512 after eliminating portions that do not meet criteria for active light signals, in accordance with an example embodiment. The computing device may be configured to determine portions of the image 508 that have a color value within the predetermined threshold orange color value, exhibit a change in color, and exhibit a change brightness from the image 414 to the image 418 depict a change. Portion 514 in FIG. 5F depicts a patch of pixels that meet these three criteria. The portion 514 has pixels that are within the predetermined threshold orange color value. Pixels of the portion 514 changed color between the image 414 and the image 418 because the left-turn signal switched from the 'off' state in the image 414 to the 'on' state in the image 418. Similarly, pixels of the portion 514 changed in intensity values between the image 414 and the image 418 because the left-turn signal switched from the 'off' state in the image 414 to the 'on' state in the image 418. Thus, the computing device may be configured to determine that there is a high likelihood the portion 514 represents a turn signal, for example. Any other image portions that do not meet all three criteria may be discarded as having a low likelihood of representing an active turn signal.

Referring back to FIG. 3, at block 306, the method 300 includes determining one or more temporal characteristics indicative of a frequency of the change in brightness of the portion in the sequence of images. In examples, referring to FIG. 5F, the computing device may be configured to sum intensities (i.e., brightness values) of pixels of the portion 514, and normalize the sum (e.g., normalized to a value of 1). In some example, the computing device may be configured to divide the image 512 in two halves, a first half including the left-turn signal, and a second half including the right-turn signal. In the example described above with respect to FIGS. 4A-4F and 5A-5F, the left-turn signal is active, while the right-turn signal is not active. Thus, the sum of intensities for the first half will be higher than a respective sum for the second half.

Further, the computing device may be configured to repeat steps described at block 304 for other pairs of images of the sequence of images received at the computing device, and compute respective sums of intensities of pixels of the portion for each pair of images. The computing device may then be configured to generate a temporal signal describing variation of the sums over time.

FIG. 6A illustrates a temporal signal representing change in intensity for the left-turn signal light, in accordance with an example embodiment. FIG. 6A shows oscillation in intensity values overtime for the active left-turn signal. The oscillation may match behavior of a vehicular turn signal that turns 'on' and 'off' at a certain frequency (e.g., blinking rate). The last data point in FIG. 6A may represent intensity of the left-turn signal at a current image or frame, for example. A positive intensity value may indicate subtracting contents of an image, which depicts the turn signal in an 'off' state, from contents of another image, which depicts the turn signal in an 'on' state, for example. For instance, a negative intensity value may indicate subtracting contents of a previous image, which depicts the turn signal in an 'on' state, from contents of a consecutive frame, which depicts the turn signal in an 'off' state.

FIG. 6B illustrates a temporal signal representing change in intensity for the right-turn signal light, in accordance with an example embodiment. Intensity values for the right-turn signal are approximately zero because the right-turn signal is not active in the example described herein.

Referring back to FIG. 3, at block 308, the method 300 includes determining, based on the one or more temporal characteristics, that the portion indicates a light signal for the identified vehicle. The computing device may be configured to filter the temporal signal described at block 306 and shown in FIG. 6A to determine a frequency of change in intensities. The filter may be designed to compare the frequency of change in intensities to an expected temporal frequency (e.g., blinking rate) of a vehicular turn signal. In one example, the computing device may be configured to implement a Gabor filter, and process the temporal signal through the Gabor filter.

The Gabor filter may include a linear filter used for edge detection. The Gabor filter may be characterized by frequency and orientation representations that may be similar to those of the human visual system. In spatial domain, a two-dimensional Gabor filter may include a Gaussian kernel function modulated by a sinusoidal plane wave, for example. The Gabor filter may be designed to whether the frequency of change in the temporal signal matches an expected temporal frequency of a turn signal over a Gaussian window. The Gabor filter produces a maximum value, if the frequency matches the expected frequency.

FIG. 6C illustrates a filtered temporal signal associated with the left-turn signal light, in accordance with an example embodiment. FIG. 6C depicts a Gabor filter response to the temporal signal depicted in FIG. 6A. Peaks of the oscillatory wave shown in FIG. 6C indicate that the frequency of the temporal signal shown in FIG. 6A substantially matches the expected frequency of a vehicular turn signal.

FIG. 6D illustrates a filtered temporal signal associated with the right-turn signal light, in accordance with an example embodiment. FIG. 6D depicts a Gabor filter response to the temporal signal depicted in FIG. 6B. The right-turn signal is not active in the example described herein, and thus, the Gabor filter response is showing a substantially flat minimal response indicating that the frequency of the temporal signal shown in FIG. 6B does not match the expected frequency of a vehicular turn signal.

The Gabor filter is used herein as an example only and any other type of filters can be used. In some examples, the computing device may be configured to process the temporal signal through a decision tree classification system, or produce other metrics indicative of whether the frequency of the temporal signal matches the expected frequency of a turn signal.

Referring back to FIG. 3, at block 310, the method 300 includes providing, by the computing device, instructions to control the given vehicle based on the light signal of the identified vehicle. The control system of the vehicle may support multiple control strategies and associated driving behaviors that may be predetermined or adaptive to changes in a driving environment of the vehicle. Generally, a control strategy may comprise sets of rules associated with traffic interaction in various driving contexts. The control strategy may comprise rules that determine a speed of the vehicle and a lane that the vehicle may travel on while taking into account safety and traffic rules and concerns (e.g., vehicles stopped at an intersection and windows-of-opportunity in yield situation, lane tracking, speed control, distance from other vehicles on the road, passing other vehicles, and queuing in stop-and-go traffic, avoiding areas that may result in unsafe behavior such as oncoming-traffic lanes, vehicles having active turn signals, etc.). For instance, the computing device may be configured to determine that a given vehicle in front of the vehicle controlled by the computing device has an active turn signal to the left or right. The given vehicle may, for example, change lines to a lane currently occupied by the vehicle controlled by the computing device. Accordingly, the computing device may be configured to select a control strategy comprising rules for actions that control the vehicle such that the vehicle may slow down, switch lanes, alert the driver, etc.

In an example, a given control strategy may comprise a program or computer instructions that characterize actuators controlling the vehicle (e.g., throttle, steering gear, brake, accelerator, or transmission shifter) based on determining that a given vehicle has an active turn signal. The given control strategy may include action sets ranked by priority, and the action sets may include alternative actions that the vehicle may be configured to take to accomplish a task (e.g., driving from one location to another). The alternative actions may be ranked based on whether a given vehicle in a vicinity of the vehicle controlled by the computing device has an active turn signal, for example.

In another example, multiple control strategies (e.g., programs) may continuously propose actions to the computing device. The computing device may be configured to decide which strategy may be selected based on a weighted set of goals (e.g., safety, speed, adhering to lane boundary, etc.), for example. Based on an evaluation of the weighted set of goals, the computing device, for example, may be configured to rank the multiple control strategies and respective action sets and determine a given control strategy and a respective action set based on the ranking.

As an example, providing instructions to control the vehicle may comprise determining a desired path of the vehicle, based on determining whether a given vehicle in a vicinity of the vehicle has an active turn signal. In one example, the computing device may determine that the given vehicle does not have an active turn signal. In this example, the computing device may be configured to maintain a vehicle path without changes. Alternatively, in another example, the computing device may determine that the given vehicle does not have an active turn signal. In this example, the computing device may be configured to change the vehicle path to take into account the likelihood that the given vehicle may change lanes and influence a current path of the vehicle controlled by the computing device.

Thus, the computing device may be configured to provide instructions (e.g., instructions that may comprise an action set or rule set) that may be executed to control actuators of the vehicle. For instance, the computing device may be configured to provide program instructions to adjust translational velocity, or rotational velocity, or both, of the vehicle such that the vehicle may respond to the given vehicle having an active turn signal.

These control actions and driving situations are for illustration only. Other actions and situations are possible as well. In one example, the computing device may be configured to control the vehicle based on the modified control strategy as an interim control until a human driver can take control of the vehicle. Also, although the method 300 is described in the context of detecting an active turn signal, the method 300 can be used to detect any other type of light signals such as a brake light, headlamp light, an auxiliary lamp light, or a strobe light of a police car. These are just examples, and other light signals can be detected by the method 300.

In some embodiments, the disclosed methods may be implemented as computer program instructions encoded on a computer-readable storage media in a machine-readable format, or on other non-transitory media or articles of manufacture. FIG. 7 is a schematic illustrating a conceptual partial view of an example computer program product 700 that includes a computer program for executing a computer process on a computing device, arranged according to at least some embodiments presented herein. In one embodiment, the example computer program product 700 is provided using a signal bearing medium 701. The signal bearing medium 701 may include one or more program instructions 702 that, when executed by one or more processors (e.g., processor 113 in the computing device 111) may provide functionality or portions of the functionality described above with respect to FIGS. 1-6D. Thus, for example, referring to the embodiments shown in FIG. 3, one or more features of blocks 302-310 may be undertaken by one or more instructions associated with the signal bearing medium 701. In addition, the program instructions 702 in FIG. 7 describe example instructions as well.

In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 701 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming to the IEEE 802.11 standard or other transmission protocol).

The one or more programming instructions 702 may be, for example, computer executable and/or logic implemented instructions. In some examples, a computing device such as the computing device described with respect to FIGS. 1-6D may be configured to provide various operations, functions, or actions in response to the programming instructions 702 conveyed to the computing device by one or more of the computer readable medium 703, the computer recordable medium 704, and/or the communications medium 705. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
receiving, at a computing device, a sequence of images of an identified vehicle in a vicinity of a given vehicle, wherein the sequence of images is captured by an image-capture device coupled to the given vehicle;
determining, based on a comparison of a first image of a pair of images of the sequence of images to a second image of the pair of images, a portion of image data exhibiting a change in color and a change in brightness between the first image and the second image of the pair of images;
determining one or more temporal characteristics indicative of a frequency of the change in brightness of the portion in the sequence of images;
determining, based on the one or more temporal characteristics, that the portion indicates a light signal for the identified vehicle;
providing, by the computing device, instructions to control the given vehicle based on the light signal of the identified vehicle.

2. The method of claim 1, further comprising:
processing images of a road of travel of the given vehicle to identify respective vehicles within a threshold distance from the given vehicle, wherein the identified vehicle is one of the respective vehicles, and
wherein processing the images comprises processing the images to remove given vehicles that are at least partially occluded by other objects on the road of travel of the given vehicle.

3. The method of claim 1, further comprising:
determining, using the computing device, a feature in the first image of the pair of images, and a corresponding feature in the second image;
determining, based on a comparison of the feature to the corresponding feature, a transform; and
applying the transform to align the first image with the second image.

4. The method of claim 1, further comprising:
comparing the first image to the second image, wherein comparing the first image to the second image comprises subtracting content of the first image of the pair of images from content of the second image of the pair of images, or the content of the second image from the content of the first image.

5. The method of claim 1, wherein the light signal includes one of a turn signal, a brake light, headlamp light, an auxiliary lamp light, or a strobe light of a police car.

6. The method of claim 1, wherein the light signal is an active turn signal, and wherein determining, based on the one or more temporal characteristics, that the portion indicates the active turn signal for the identified vehicle comprises comparing the frequency of the change in brightness over a predetermined period of time to a blinking rate of a vehicular turn signal.

7. The method of claim 1, wherein determining the portion of image data comprises:
identifying, in at least one of the first image and the second image, pixels having respective color values that are within a predetermined color value threshold from a characteristic color of a vehicular signal;
determining that the respective color values of the pixels changed between the first image and the second image; and
determining that respective intensity values of the pixels changed between the first image and the second image.

8. The method of claim 1, further comprising:
generating a temporal signal depicting the change in the brightness of the portion over time, wherein the one or more temporal characteristics are based on respective characteristics of the temporal signal.

9. The method of claim 1, wherein the brightness of the portion is indicated by a level of intensity of pixels composing the portion the image data.

10. The method of claim 1, wherein the given vehicle is configured to operate in an autonomous operation mode.

11. A non-transitory computer readable medium having stored thereon executable instructions that, upon execution a computing device, cause the computing device to perform functions comprising:
receiving a sequence of images of an identified vehicle in a vicinity of a given vehicle, wherein the sequence of images is captured by an image-capture device coupled to the given vehicle;
determining, based on a comparison of a first image of a pair of images of the sequence of images to a second image of the pair of images, a portion of image data exhibiting a change in color and a change in brightness between the first image and the second image of the pair of images;
determining one or more temporal characteristics indicative of a frequency of the change in brightness of the portion in the sequence of images;
determining, based on the one or more temporal characteristics, that the portion indicates a light signal for the identified vehicle;
providing instructions to control the given vehicle based on the light signal of the identified vehicle.

12. The non-transitory computer readable medium of claim 11, wherein the light signal includes one of a turn signal, a brake light, headlamp light, an auxiliary lamp light, or a strobe light of a police car.

13. The non-transitory computer readable medium of claim 11, wherein the light signal is an active turn signal, and wherein the function of determining, based on the one or more temporal characteristics, that the portion indicates the active turn signal for the identified vehicle comprises:
comparing the frequency of the change in brightness over a predetermined period of time to a blinking rate of a vehicular turn signal.

14. The non-transitory computer readable medium of claim 11, wherein the function of determining the portion of image data comprises:
identifying, in at least one of the first image and the second image, pixels having respective color values that are within a predetermined color value threshold from a characteristic color of a vehicular signal;
determining that the respective color values of the pixels changed between the first image and the second image; and
determining that respective intensity values of the pixels changed between the first image and the second image.

15. The non-transitory computer readable medium of claim 11, wherein the brightness of the portion is indicated by a level of intensity of pixels composing the portion.

16. A control system comprising:
at least one processor; and
a memory having stored thereon executable instructions that, upon execution by the at least one processor, cause the control system to perform functions comprising:
receiving a sequence of images of an identified vehicle in a vicinity of a given vehicle, wherein the sequence of images is captured by an image-capture device coupled to the given vehicle;
determining, based on a comparison of a first image of a pair of images of the sequence of images to a second image of the pair of images, a portion of image data exhibiting a change in color and a change in brightness between the first image and the second image of the pair of images;
determining one or more temporal characteristics indicative of a frequency of the change in brightness of the portion in the sequence of images;
determining, based on the one or more temporal characteristics, that the portion indicates a light signal for the identified vehicle;
providing instructions to control the given vehicle based on the light signal of the identified vehicle.

17. The control system of claim 16, wherein the functions further comprise:
processing images of a road of travel of the given vehicle to identify respective vehicles within a threshold distance from the given vehicle, wherein the identified vehicle is one of the respective vehicles, and
wherein processing the images comprises processing the images to remove given vehicles that are at least partially occluded by other objects on the road of travel of the given vehicle.

18. The control system of claim 16, wherein the functions further comprise:
determining a feature in the first image of the pair of images, and a corresponding feature in the second image;
determining, based on a comparison of the feature to the corresponding feature, a transform; and
applying the transform to align the first image with the second image.

19. The control system of claim 16, wherein the functions further comprise:
comparing the first image to the second image, wherein comparing the first image to the second image comprises subtracting content of the first image of the pair of images from content of the second image of the pair of images, or the content of the second image from the content of the first image.

20. The control system of claim 16, wherein the control system is configured to control the vehicle in an autonomous operation mode.

* * * * *